E. T. WILLIAMS.
ICE MAKING AND HARVESTING APPARATUS.
APPLICATION FILED JUNE 13, 1910.
1,051,297.
Patented Jan. 21, 1913.
2 SHEETS—SHEET 1.
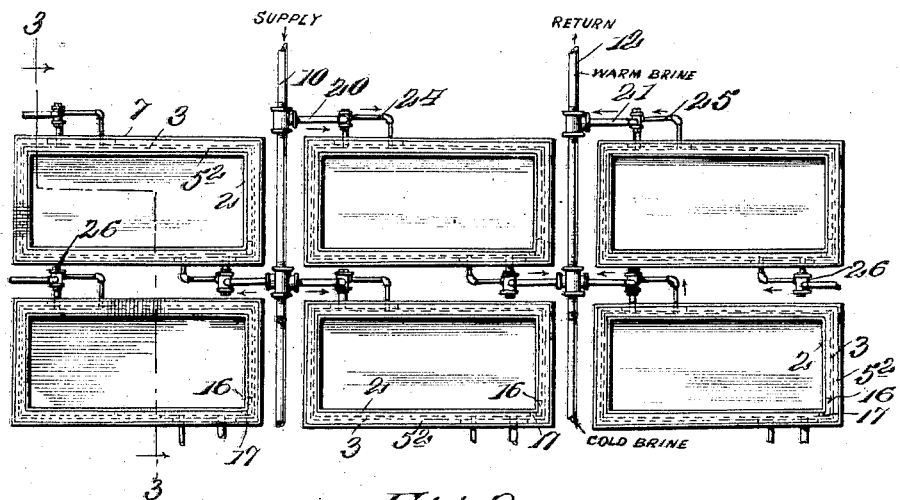
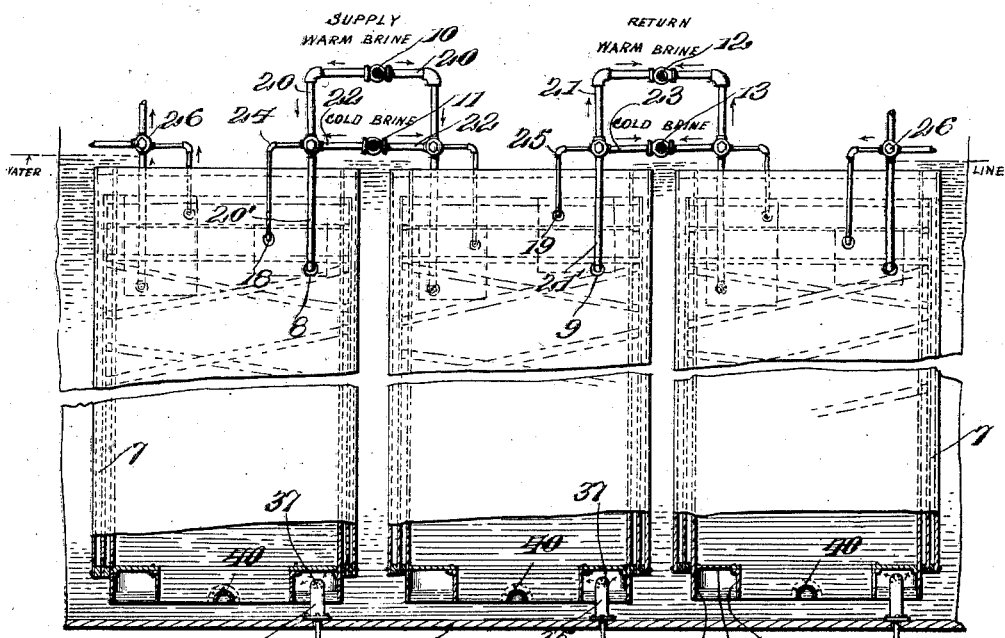

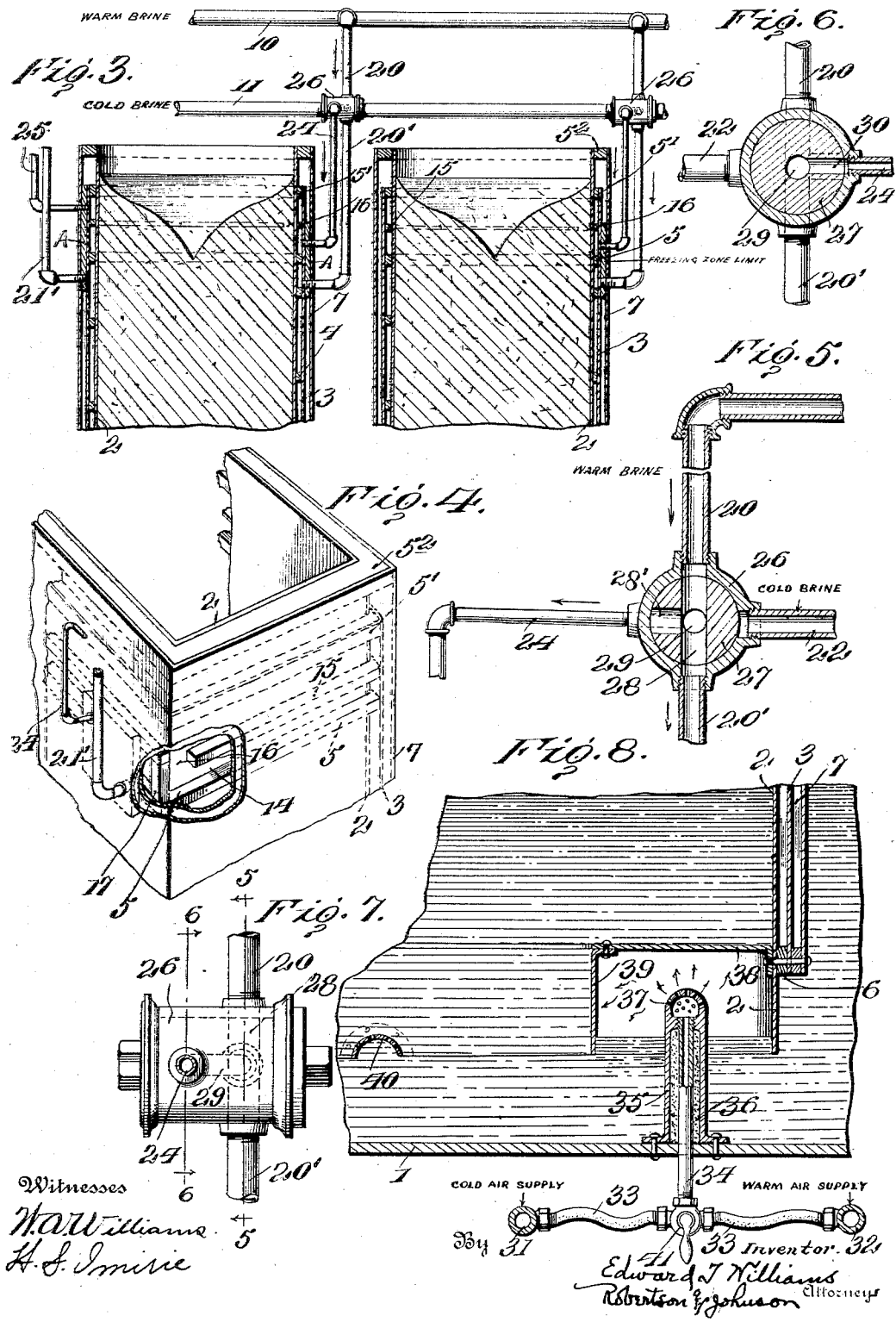

UNITED STATES PATENT OFFICE.

EDWARD THOMPSON WILLIAMS, OF BROOKLYN, NEW YORK.

ICE MAKING AND HARVESTING APPARATUS.

1,051,297.     Specification of Letters Patent.     Patented Jan. 21, 1913.

Application filed June 13, 1910. Serial No. 566,660.

*To all whom it may concern:*

Be it known that I, EDWARD T. WILLIAMS, a citizen of the United States, and a resident of Brooklyn, in the county of Kings and State of New York, have invented new and useful Improvements in Ice Making and Harvesting Apparatus, of which the following is a specification.

My invention relates to ice making and harvesting apparatus and is designed primarily for use in connection with molds submerged in a tank containing the water to be frozen, being intended more especially as an improvement on the system illustrated in my application Ser. No. 554,943, filed April 12, 1910.

In ice making apparatus difficulty has frequently been experienced in confining the formation of ice to the precise limits desired, there being a tendency for the ice to form by conduction beyond such limits. This difficulty is only partially met by limiting the freezing zone and by the use of wooden supports. Where the ice is harvested by passing warm fluid through the freezing means, it is obvious that the zone of effective thawing action is confined to the freezing and thawing means itself and that it has little effect on any ice formed beyond said limit. In this connection it is to be borne in mind that the thawing operation occupies but a few minutes, while the freezing operation occupies from 30 to 40 hours or even more where systems of inferior efficiency are used. It is obvious therefore that the normal freezing and thawing means may be inadequate to thaw out this extra ice promptly.

In my co-pending application, above referred to, I provide means for thawing any such ice which may be formed below the lower limit of the normal freezing zone. In my present application I provide improved means of this character at the bottom of the molds, and have devised also auxiliary thawing means to assist in harvesting by thawing out any ice which may be formed above the normal freezing limit. This means is individual to each mold and extends continuously up from the top of the freezing zone, the thawing fluid coming directly into contact with the inner wall of the mold. I have illustrated a form of this means especially adapted to my system and I have devised also special connections, all of which, together with other features of my invention will be more fully referred to hereinafter.

Systems for circulating fluids, as brine, in ice making apparatus including piping, a pump, etc., are well known in the art, and complete systems for circulating freezing fluid and for circulating thawing fluid, including apparatus for heating the one and for cooling the other, are illustrated and described in my aforesaid co-pending application, Ser. No. 554,943, and nothing would be gained by duplicating such illustration and description in this application.

Referring to the drawings: Figure 1 is a plan view of a plurality of molds with the fluid connections therefor. Fig. 2 is an elevation, partly in section, corresponding to Fig. 1. Fig. 3 is a detail sectional view on the line 3—3, Fig. 1, the probable shape of the top of the ice cake being somewhat exaggerated. Fig. 4 is an incomplete perspective view of one of the molds, parts of the outer shell being broken away to show the arrangement of the partitions and opening in the auxiliary thawing chamber. Fig. 5 is a vertical section through one of the controlling valves on the line 5—5, Fig. 7, looking in the direction of the arrows. Fig. 6 is a similar section on the line 6—6, Fig. 7, looking in the direction of the arrows. Fig. 8 is a detail view illustrating the means for delivering air to the bottom of one of the molds.

In the tank 1, are submerged in the water to be frozen upright molds having inner walls 2 and outer walls 3, constituting a freezing jacket, the construction of which is no part of my present invention, and may vary as desired, but is preferably such as to cause rapid circulation of the freezing or thawing fluid as by the partition 4. The space between the walls 2 and 3 is closed at the top by a frame 5 the joints thus formed being water tight. At the bottom it is closed by a similar frame 6. Each mold is suitably inclosed by an insulating air jacket 7. The freezing and thawing jacket is provided with an inlet 8 and an outlet 9 for connection respectively with one of the supply and with one of the return headers. These headers are the warm brine supply headers 10, the cold brine supply headers 11, the warm brine return headers 12, and the cold brine return headers 13. Thus far the construction is not different from that described in my application above referred to.

Adjacent the top of the freezing and thawing jacket I locate an auxiliary thawing chamber 14 formed by extending the walls 2—3 upward, a frame 5' closing the space between the walls being provided. The depth of the thawing chamber need not usually be very great but should be sufficient to secure the desired action. In order to cause the thawing fluid to circulate completely around the auxiliary chamber so as to have a uniform action and to affect all parts of the ice to be thawed, I prefer to provide a horizontal partition 15, dividing the chamber into two distinct parts having no connection save for an opening 16 through which the freezing fluid flows only when it reaches the top of the lower compartment thus formed. I also prefer to provide a transverse vertical partition 17 which divides the lower compartment in half and is located adjacent the thawing fluid inlet 18 so as to compel the said fluid to travel completely around the mold in order to reach the opening 16 which is located adjacent the partition on the side away from the inlet. The outlet 19 is located above the inlet 18 and, where the horizontal partition is employed, opens from the upper compartment of the auxiliary chamber. This arrangement necessitates the flow of the fluid completely around the lower compartment, which it fills, then rising into the upper compartment to the level of the outlet, through which it flows to the return pipe. In flowing around the upper compartment it may divide and flow both ways or may possibly flow, wholly or chiefly in one direction. It will be noted that the outlet 19 is diagonally opposite the inlet 18 or substantially so. This lengthens the path of flow of the fluid.

The mold is strengthened and accuracy secured by providing between the wall 3 and the outer wall of the dead air jacket 7 plates A in which are located all the inlet and outlet openings, the plate on the inlet side extending to the middle of the auxiliary thawing chamber, and that on the outlet side extending to the top of said chamber.

To avoid any possibility of ice forming over the top of the mold—which might perhaps occur if brine were left in the auxiliary thawing chamber during the freezing process—I extend the insulating dead air space up to the top of the mold and over the auxiliary thawing chamber, closing it with the frame 5² which is equal in width to the combined widths of the interior of the auxiliary thawing chamber, its wall 3 and the interior of the jacket 7.

My invention also deals with the connection between the supply and return pipes 10, 11, 12 and 13 and the freezing jacket, and between the warm supply and return pipes 10 and 12 and the auxiliary thawing chamber. Generally speaking the system for supplying freezing and thawing fluid as brine is advantageously that described in my previous specification above referred to and more particularly that illustrated in Figs. 12 to 15. By this arrangement the freezing and thawing means of each mold is connected by a pipe 20 to a warm supply header 10 and by a pipe 21 to a warm return header 12, and similarly by a pipe 22 to a cold supply header 11 and by the pipe 23 to a cold return header 13. The inlet and the outlet of the auxiliary thawing means of each mold is also connected by pipes 24 and 25 respectively to warm supply headers 10 and to warm return headers 12. In order to secure the desired results I must be able to feed either cold brine or warm brine to the freezing jacket, as desired, without at any time feeding cold brine to the auxiliary thawing jacket, and I must also be able to feed warm brine to the auxiliary thawing chamber at the same time that I am feeding it to the freezing and thawing jacket. Accordingly I provide valves of special construction for controlling both the supply and the return. For convenience I have designated the part of the supply piping between the valve and the inlet as 20' and the part of the return piping between the outlet and the valve as 21'. The valve illustrated (see Figs. 5, 6 and 7) is shown in connection with the various supply pipes, but it will be evident that the construction of the return valve is precisely the same.

Referring particularly to Figs. 5, 6 and 7, it will be seen that the supply pipes 20, 22, 20' and the inlet pipe 24 are in communication with a valve casing 26 and are controlled by a valve body 27 in said casing. This valve body has the usual T-shaped three-way passage 28, 28' which enables it to deliver either cold or warm brine to the freezing and thawing jacket or to shut off the supply of both and which is located in the same vertical plane as the supply pipes 20, 22 and 20'. It will be noted that the opening in the casing for the pipe 24 is in a different vertical plane from that of the T-shaped three-way passage 28, 28' and of the opening for the pipes 20, 22 and 20'. It will be observed also that the body 27 has a central longitudinal bore 29 and a transverse passage 30, which latter may be brought into registration with the pipe 24 being in the same vertical plane therewith. The relative location of the said transverse passage 30 and the three-way passage 28 is such that the transverse passage is in registration with the pipe 24 when the pipes 20 and 20' are in communication, and that the transverse passage 30 is at all other times out of registration with the pipe 24, thus making it impossible for cold brine to be fed to the auxiliary chamber. When the mold jacket is being served with freezing fluid, the plug is turned till the head 28 of the T-shaped three-way passage registers with supply pipe 22, the other end of the head being closed by the valve casing 26 and the passage 28' of the T-shaped three-way passage registers with the inlet pipe 20'. At the same time the transverse passage 30 moves out of registration with the pipe 24 and is closed by the casing 26.

In the above description, I have considered the auxiliary chamber as designed to be warmed with brine or other fluid requiring a return system of piping. This I regard as the most desirable arrangement. It is, however, possible to use air and where this is done no return system is necessary, it being sufficient to provide a small air pipe between every second row of molds, the said pipe being connected to the auxiliary chambers, and the said chambers being provided with outlets to the open air above the water level. These pipes would each supply two rows of cans. Where air is employed, it should be introduced at the upper part of the auxiliary chamber and the outlet should be located at the lower part, the purpose of this arrangement being to prevent any moisture carried in by the warm air from condensing and settling in the chamber and freezing there, which might eventually close the entire space with ice. When the air is used in the way suggested any such moisture would be discharged at each thawing and the space left substantially clear.

My invention deals also, as above suggested, with the means for delivering cold or warm air to the bottom of the molds to assist in freezing and in thawing. Instead of locating the air supply pipes in the tank, as illustrated in my aforesaid application, I locate them below the tank, the tank itself, the space in which the pipes are placed, or the pipes themselves being insulated. This enables me to secure individual control for the air delivering means for each mold, so that the molds may be operated in this respect, as well as in every other, as units, it being immaterial what is going on in any other mold so far as the mold in question is concerned. I have also improved the air delivering nozzle. 31 is the cold air supply pipe and 32 the warm air supply pipe, which are located in pairs under each line of molds. These pipes are connected to the individual delivery pipes 34 by flexible pipes 33, suitably of lead, to permit, without injury, the contraction and expansion which their use entails. The pipe 34 is protected by a metal sheath 35 and by insulating material 36 of suitable composition. The sheath 35 is securely fastened to the bottom of the tank, the joint being water tight, and its upper end constitutes a perforated cap or rose 37 to which the pipe 34 delivers air and from which the air escapes to the bottom 38 of the mold in the space extending around the mold between the extension of the inner wall 2 and the shell 39. Thence, as in the construction of my said application, it is led by the bridge 40 to a point below the center of the mold and escaping through the perforations in the bridge passes up through the water in the mold, thus performing the double function of assisting in freezing the ice and agitating the water. While I have not shown any other means for agitating the water in the molds, it will be apparent that I might also employ in addition jets of air or water. Three-way valves 41 having the dead point, when the can is entirely out of service, toward the delivery pipe control the connections between the supply pipes and each individual delivery nozzle, the valves being turned to one side to admit cold air during freezing and to the other side to admit warm air during harvesting to the delivery pipe and nozzle. These improvements enable me to operate my tank, however large, on the basis of the individual mold as a unit, and to so operate it both in freezing and in harvesting. It also obviates any possibility of difficulty by reason of the cake sticking because of ice formed beyond the normal freezing zone, whether above or below the said zone, and increases the rapidity of the thawing operation. While the formation of this ice might not be a serious matter, the ability to deal with this difficulty, should it arise, is a further perfection of the system.

I prefer to make the partition 15 of strips or bars, the opening 16 being formed by stopping one or both bars adjacent the corner. I also prefer to utilize a similar block as the transverse partition 17, locating it adjacent one end of the partition 15. It will be understood, however, that I may employ a continuous partition having a hole through it near the corner, as the partition 15 and may make it of sheet metal, and that I may locate the transverse partition 17 in the diagonal of the corner, and may make it of sheet metal. While it is a very great advantage to connect the individual freezing and thawing means for individual molds in parallel to the supply and return headers, the claims are not all designed to be limited to this mode of connection, since series arrangements, though undesirable, are possible. By referring to the molds as "open at the top," I do not of course mean to imply that they may not have removable covers when their tops are accessible.

What I claim as my invention is:

1. Ice making apparatus comprising in combination, a water tank, upright molds therein open at the top and in communication with the tank at the bottom, individual freezing and thawing means surrounding each mold, a system of pipes for handling cold fluid, a system of pipes for handling warm fluid, connections between said individual freezing and thawing means and both the hot and the cold system, individual auxiliary thawing means beyond the freezing zone of each mold, and connections between said auxiliary thawing means and said system of pipes for handling the warm fluid.

2. Ice making apparatus comprising in combination, a water tank, upright molds submerged therein open at the top and in communication with the tank at the bottom, individual freezing and thawing means surrounding each mold, a system of pipes for handling cold fluid, a system of pipes for handling warm fluid, connections between said individual means and both the hot and the cold system, individual auxiliary thawing means surrounding each mold and extending up from the top of the freezing and thawing means, and connections between said auxiliary thawing means and said system of pipes for handling the warm fluid.

3. Ice making apparatus comprising in combination, a water tank, a plurality of upright molds submerged therein open at the top and in communication therewith at the bottom, said molds being provided with freezing and thawing jackets constituting the normal freezing zone, means for introducing cold or warm fluid to said jackets and for returning it therefrom, auxiliary thawing jackets for each mold above the normal freezing zone and having no communication with the jacket constituting said zone, and connections between said auxiliary thawing jacket and the means for supplying warm fluid.

4. Ice making apparatus comprising in combination, a water tank, upright molds submerged therein open at the top and in communication with the tank at the bottom, freezing and thawing means for said molds, piping and connections for introducing cold or warm fluid to said freezing and thawing means and for returning it therefrom, auxiliary thawing jackets extending up from the top of said freezing and thawing means and having an inlet and an outlet on opposite sides of the mold and at different levels, and means for supplying warm fluid to said thawing jackets.

5. Ice making apparatus comprising in combination, a water tank, a plurality of upright molds submerged therein, open at the top and in communication therewith at the bottom, said molds being provided with freezing and thawing jackets constituting the normal freezing zone, means for introducing cold or warm fluid to said jackets and for returning it therefrom, auxiliary thawing jackets for each mold above the normal freezing zone and having no communication with the jacket constituting said zone, a dead air jacket above the auxiliary thawing jacket, means for supplying warm fluid to said auxiliary thawing jackets, and devices for controlling said means.

6. Ice making apparatus comprising in combination, a water tank, a plurality of upright molds submerged therein, open at the top and in communication therewith at the bottom, individual freezing and thawing means surrounding said molds, cold fluid supply and return pipes, warm fluid supply and return pipes, auxiliary thawing jackets independent of said freezing and thawing means and located adjacent the tops thereof, a horizontal partition in said auxiliary thawing jackets having an opening therein, and dividing the auxiliary thawing jacket into an upper and a lower compartment, an inlet to the lower compartment and an outlet from the upper compartment, connections between the freezing and thawing means and both the cold fluid and warm fluid supply and return pipes, connections between the warm fluid supply pipe and the said inlet, and connections between the said outlet and the warm fluid return pipe.

7. Ice making apparatus comprising in combination, a water tank, a plurality of upright molds submerged therein, open at the top and in communication therewith at the bottom, individual freezing and thawing means surrounding said molds, cold fluid supply and return pipes, warm fluid supply and return pipes, auxiliary thawing jackets independent of said freezing and thawing means and located adjacent the tops thereof, a horizontal partition in said auxiliary thawing jackets having an opening therein, and dividing the auxiliary jacket into an upper and a lower compartment, an inlet to the lower compartment and an outlet from the upper compartment, a transverse partition in the lower compartment dividing it into two parts and located between the inlet and the opening, connections between the freezing and thawing means and both the cold fluid and warm fluid supply and return pipes, connections between the warm fluid supply pipe and the said inlet, and connections between the said outlet and the warm fluid return pipe.

8. Ice making apparatus comprising in combination, a water tank, upright molds submerged therein open at the top and in communication therewith at the bottom, individual freezing and thawing means surrounding each mold and constituting the normal freezing zone therefor, individual auxiliary thawing means above the upper limit of said freezing zone, supply and return pipes for cold fluid, supply and return pipes for warm fluid, connections between said individual freezing and thawing means and a pair of cold fluid supply and return pipes and between said means and a pair of warm fluid supply and return pipes, and connections between said auxiliary thawing means and a warm fluid supply pipe and a warm fluid return pipe.

9. Ice making apparatus comprising in combination, a water tank, upright molds submerged therein open at the top and in communication therewith at the bottom, individual freezing and thawing means surrounding each mold and constituting the normal freezing zone therefor, individual auxiliary thawing means above the upper limit of said freezing zone, supply and return pipes for cold fluid, supply and return pipes for warm fluid, connections between said individual freezing and thawing means and a pair of cold fluid supply and return pipes and between said means and a pair of warm fluid supply and return pipes, connections between said auxiliary thawing means and a warm fluid supply pipe and a warm fluid return pipe, said connections being grouped, and means located in said grouped connections for simultaneously controlling them.

10. Ice making apparatus comprising in combination, a water tank, upright molds submerged therein open at the top and in communication therewith at the bottom, said molds being provided with freezing and thawing means constituting the normal freezing zone, pipes for conveying cold fluid, pipes for conveying warm fluid, individual auxiliary thawing chambers adjacent the tops of said freezing and thawing zones, connections between pipes for conveying cold fluid and said freezing and thawing means and between pipes for conveying warm fluid and said freezing and thawing means, connections between pipes for conveying warm fluid and said auxiliary thawing chambers, and valves in said connections having the structure of an ordinary three-way valve to control the connection between a pipe conveying warm fluid, a pipe conveying cold fluid and one of the freezing and thawing means and having a transverse passage in communication with the three-way openings and located to control the connections between a pipe for conveying warm fluid and one of the auxiliary thawing chambers, said transverse passage being so placed with reference to the three-way openings of the valve as to prevent cold fluid from being at any time delivered to the auxiliary thawing chamber while permitting warm or cold fluid to be delivered at will to the freezing or thawing chamber and warm fluid to be delivered simultaneously to both the freezing and thawing means and the auxiliary thawing chamber.

11. In ice making apparatus and in a mold having a freezing and thawing jacket, an auxiliary thawing jacket separate from said freezing and thawing jacket adjacent the upper limit of the same, and a dead air chamber above said auxiliary thawing chamber.

12. In ice making apparatus and in a mold having a freezing and thawing jacket provided with an inlet and an outlet for freezing or thawing fluid, an auxiliary thawing chamber extending up from the upper limit of said freezing zone and having an inlet and an outlet at different levels.

13. In ice making apparatus and in a freezing mold having a freezing and thawing jacket provided with an inlet and an outlet for freezing or thawing fluid, an auxiliary thawing chamber adjacent the upper end of the freezing and thawing jacket, a horizontal partition dividing said chamber into two parts, an inlet to one part of said chamber thus divided and an outlet from the other part, and a transverse partition dividing the lower part of the chamber into two parts, said partition being located adjacent the opening in the lower part of the chamber, the horizontal partition having an opening therethrough on the side of the transverse partition away from the opening in the lower part of the chamber.

14. In ice making apparatus, a mold having a freezing and thawing jacket, an auxiliary thawing jacket separate from said freezing and thawing jacket adjacent the upper limit of the same, and auxiliary thawing means at the bottom of the mold.

15. Ice making apparatus comprising in combination, a water tank, a plurality of upright molds therein open at the top and in communication therewith at the bottom, said molds being provided with freezing and thawing means individual to each mold, and with bottoms having a hole therethrough, cold air supply pipes and warm air supply pipes located below the tank, air supply nozzles within the tank and located adjacent the bottoms of the molds to deliver air thereto, connections between said supply pipes and said nozzles, and means for controlling the delivery of air to supply warm air to the bottoms of certain molds while cold air is being supplied to the bottoms of certain other molds.

16. Ice making apparatus comprising in combination, a water tank, a plurality of upright molds receiving water therefrom open at the top and in communication therewith at the bottom, said molds being provided with freezing and thawing means individual to each mold, and with bottoms having a hole therethrough, cold air supply pipes and warm air supply pipes located outside the tank, air supply nozzles within the tank and located adjacent the bottoms of the molds to deliver air thereto, connections between a cold air supply pipe and a warm air supply pipe and each of said nozzles, and valves in said connections for controlling each individual nozzle irrespective of any other.

17. Ice making apparatus comprising in combination, a water tank, a plurality of upright molds submerged therein open at the top and in communication therewith at the bottom, freezing means for said molds, said molds having bottoms provided with downwardly extending walls forming an open bottomed air trapping space, air supply pipes, air delivering nozzles located below said bottoms to deliver air to said spaces and comprising a metal sheath secured by water tight connection to the bottom of the tank, an air pipe attached thereto, and insulation between said sheath and pipe said sheath being provided with a delivery rose, connections between said supply pipes, and delivery nozzles, and means for controlling the same.

18. Ice making apparatus comprising in combination, a water tank, a plurality of molds therein open at the top and in communication therewith at the bottom, said molds being provided with freezing and thawing means, and with bottoms having a hole therethrough surrounded by a depending open bottomed shell and having a wall extending below the bottom to form with the said depending shell an open bottomed space in which air is trapped, cold air supply pipes and warm air supply pipes located below the tank, air supply nozzles within the tank secured to the bottom thereof and located adjacent the bottoms of the molds to deliver air to the spaces above mentioned, flexible connections between a cold air supply pipe and a warm air supply pipe and each of said nozzles, and valves in said connections for controlling each individual nozzle irrespective of any other.

19. In ice making apparatus, an air delivering nozzle comprising an air delivery pipe, a metal sheath therefor having air delivering perforations, and insulation between said sheath and pipe.

20. Ice making apparatus comprising in combination, a water tank, a plurality of upright molds receiving water therefrom open at the top and in communication therewith at the bottom, and having bottoms provided with downwardly extending walls forming an open bottomed air trapping space, cold air supply pipes, warm air supply pipes, delivery pipes for supplying cold or warm air to said spaces, separate connections between each delivery pipe and two of said supply pipes, said supply pipes being outside said tank and means in said connections for controlling the delivery of air to supply warm air to the bottoms of some molds while cold air is being supplied to the bottoms of other molds.

21. Ice making apparatus comprising in combination, a water tank, a plurality of upright molds receiving water therefrom open at the top and in communication therewith at the bottom, and having bottoms provided with downwardly extending walls forming an open bottomed air trapping space, cold air supply pipes, warm air supply pipes, delivery pipes for supplying cold or warm air to said spaces, connections between each delivery pipe and two of said supply pipes, and a valve in each such connection to control each delivery pipe individually independently of any other.

22. Ice making apparatus comprising in combination, a water tank, upright molds submerged therein open at the top and in communication with the tank at the bottom, freezing jackets surrounding individual molds, auxiliary thawing means beyond the upper and lower limits of said freezing and thawing jacket, piping for supplying fluid to said freezing jackets and to said thawing means, and devices for controlling said piping.

23. Ice making apparatus comprising in combination a water tank, upright molds submerged therein open at the top and in communication therewith at the bottom, freezing means for individual molds, systems of piping for supplying cold and warm fluid, auxiliary thawing means beyond the upper and lower limits of said freezing and thawing means, connections between the freezing means and the system of piping for supplying cold fluid and the system of piping for supplying warm fluid, connections between said auxiliary thawing means, and a system of piping for supplying warm fluid, and devices for controlling said connections.

24. Ice making apparatus comprising in combination, a water tank, upright molds submerged therein open at the top and having bottoms in communication with the tank by means of a hole therethrough, individual freezing and thawing means for each mold, auxiliary thawing chambers above the freezing and thawing means of each mold, devices for delivering warm or cold air to the bottoms of individual molds, cold fluid supply pipes and warm fluid supply pipes, connections between the freezing and thawing zones and the cold and warm fluid supply pipes, and connections between the warm fluid supply pipes and the auxiliary thawing chambers, cold air supply pipes, warm air supply pipes, connections between said pipes and the air delivering devices for individual molds, and controlling means in both the kinds of connections specified to enable each mold to be treated in the freezing and thawing processes as an independent unit.

25. Ice making apparatus comprising in combination, a water tank, upright molds submerged therein open at the top and in communication therewith at the bottom, individual freezing and thawing means surrounding each mold and constituting the normal freezing zone therefor, individual auxiliary thawing means above the upper limit of said freezing zone, supply and return pipes for cold fluid, supply and return pipes for warm fluid, connections between said individual freezing and thawing means and a pair of cold fluid supply and return pipes and between said means and a pair of warm fluid supply and return pipes, connections between said auxiliary thawing means and a warm fluid supply pipe and a warm fluid return pipe, said connections being grouped, and a valve in said grouped connections for admitting cold fluid to the freezing and thawing means while excluding it from the auxiliary thawing means and for admitting warm fluid simultaneously to the freezing and thawing means and to the auxiliary thawing means while excluding cold fluid from both.

26. Ice making apparatus comprising in combination, a water tank, a plurality of upright freezing molds submerged therein open at the top and in communication therewith at the bottom, auxiliary thawing chambers individual to each mold and located above the upper limit of the normal freezing zone, a system for circulating thawing fluid connections between said auxiliary thawing chamber and system, and devices for controlling said connections.

27. Ice making apparatus comprising in combination, a water tank, a plurality of upright molds submerged therein open at the top and in communication therewith at the bottom, freezing and thawing means individual to each mold, individual auxiliary thawing means adjacent the top of said freezing and thawing means, a system for circulating freezing fluid and thawing fluid, connections between said system and said freezing and thawing means and between said system and said auxiliary thawing means, and devices for simultaneously varying said connections to enable one part of the apparatus to be subjected to freezing while another is being subjected to thawing.

28. Ice making apparatus comprising in combination, a water tank, a plurality of upright molds therein, individual freezing and thawing devices for each mold, individual auxiliary thawing means adjacent the top of said freezing and thawing devices, a freezing fluid supply and return system, a thawing fluid supply and return system, connections between each of said individual freezing and thawing devices and both said systems, piping connecting each of said auxiliary thawing devices to the said connections of the corresponding freezing and thawing devices, and valves in each of said connections governing the same and said piping to control each individual mold at will independently of any other.

29. In ice making apparatus, a mold having a freezing and thawing jacket, an auxiliary thawing jacket above said freezing and thawing jacket, a dead air jacket outside said other two jackets, and spacing plates within said dead air jacket having a thickness equal to the interior thereof, extending past parts of said other two jackets, and containing openings communicating with the interiors of said other jackets.

30. Ice making apparatus comprising in combination, a water tank, upright molds receiving water therefrom and in communication therewith at their bottoms, freezing and thawing means for said molds constituting the normal freezing zone therefor, individual closed auxiliary thawing chambers beyond the normal freezing zone, and means for delivering thawing fluid to said auxiliary chambers.

31. Ice making apparatus comprising in combination, a water tank, a plurality of upright molds receiving water therefrom and in communication with said tank at their bottoms, freezing and thawing jackets for said molds, an auxiliary thawing chamber beyond the normal freezing zone, means for delivering freezing fluid or thawing fluid to the freezing and thawing jacket, means for delivering thawing fluid to said auxiliary thawing chamber, and a valve simultaneously controlling both the said means.

32. Ice making apparatus comprising in combination, a water tank, a plurality of upright molds in communication at their bottoms therewith, freezing and thawing jackets for said molds, auxiliary thawing chambers beyond the freezing zone, freezing fluid supply and return pipes, thawing fluid supply and return pipes, connections between said freezing and thawing jackets and freezing and thawing supply and return pipes, connections between said auxiliary thawing chambers and thawing supply and return pipes, the supply connections being grouped and the return connections being grouped, and a valve in each group of connections controlling the same.

Signed by me this 9th day of June, 1910.

EDWARD THOMPSON WILLIAMS.

Witnesses:
HARRY T. BERNHARD,
JENNIE DUPREE.